(12) United States Patent  
Collar et al.

(10) Patent No.: US 12,337,554 B2  
(45) Date of Patent: Jun. 24, 2025

(54) FIBER REINFORCED ELONGATE PROFILED OBJECT

(71) Applicant: SABIC GLOBAL TECHOLOGIES B.V., Bergen op Zoom (NL)

(72) Inventors: Curtis Collar, Houston, TX (US); Talal Mansour Al-Safi, Riyadh (SA); Abdul Rahim Ahamed Arafath, Riyadh (SA); John Gillespie McCann, Houston, TX (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 810 days.

(21) Appl. No.: 16/612,874

(22) PCT Filed: Jul. 12, 2018

(86) PCT No.: PCT/IB2018/055160  
§ 371 (c)(1),  
(2) Date: Nov. 12, 2019

(87) PCT Pub. No.: WO2019/012477  
PCT Pub. Date: Jan. 17, 2019

(65) Prior Publication Data  
US 2020/0139652 A1 May 7, 2020

Related U.S. Application Data

(60) Provisional application No. 62/532,600, filed on Jul. 14, 2017.

(51) Int. Cl.  
*B29C 70/50* (2006.01)  
*B29C 48/07* (2019.01)  
(Continued)

(52) U.S. Cl.  
CPC .............. *B29C 70/50* (2013.01); *E04G 5/08* (2013.01); *B29C 48/07* (2019.02);  
(Continued)

(58) Field of Classification Search  
CPC ................................................ B32B 2262/101  
See application file for complete search history.

(56) References Cited

U.S. PATENT DOCUMENTS 4,492,063 A * 1/1985 Schock ................... E06B 3/221  
52/745.15  
4,559,262 A 12/1985 Cogswell et al.  
(Continued)

FOREIGN PATENT DOCUMENTS

CN 204357099 U 5/2015  
EP 0056703 A1 7/1982  
(Continued)

OTHER PUBLICATIONS

"Long Fiber Reinforced Thermoplastic Composites for Profile Extrusion", PlastiComp, Inc. 2019.  
(Continued)

*Primary Examiner* — Alicia J Weydemeyer  
(74) *Attorney, Agent, or Firm* — CANTOR COLBURN LLP (57) ABSTRACT

Elongate profiled object having a cross section, the object comprising a peripheral wall, forming a hollow profile extending in a longitudinal direction, wherein at least part of the peripheral wall is provided with a reinforcement element, and wherein the elongate profiled object is made of a thermoplastic material.

11 Claims, 5 Drawing Sheets

(51) Int. Cl.
*B29K 101/12* (2006.01)
*B29K 105/12* (2006.01)
*E04G 5/08* (2006.01)

(52) U.S. Cl.
CPC ...... *B29K 2101/12* (2013.01); *B29K 2105/12* (2013.01); *B32B 2262/101* (2013.01)

(56) References Cited

U.S. PATENT DOCUMENTS

| | | | |
|---|---|---|---|
| 9,045,369 B2 | 6/2015 | Baker | |
| 9,222,269 B2 | 12/2015 | Bruins | |
| 2001/0021431 A1* | 9/2001 | Chen | B32B 27/06 428/167 |
| 2003/0157280 A1* | 8/2003 | Boissonnat | B29C 48/15 425/114 |
| 2003/0198780 A1* | 10/2003 | Campese | B29C 70/521 428/141 |
| 2007/0131483 A1* | 6/2007 | Bothwell | E04G 1/152 182/222 |
| 2007/0256379 A1* | 11/2007 | Edwards | B32B 5/145 52/309.9 |
| 2010/0320032 A1* | 12/2010 | Rijken | E04G 5/08 428/113 |
| 2013/0136877 A1 | 5/2013 | Nelson et al. | |
| 2014/0106166 A1 | 4/2014 | Nelson et al. | |

FOREIGN PATENT DOCUMENTS

| | | | | |
|---|---|---|---|---|
| EP | 2540933 A1 | * | 1/2013 | ............... E04G 9/05 |
| FR | 2948895 | * | 2/2011 | |
| GB | 2524780 A | | 10/2015 | |
| WO | 2009054716 A1 | | 4/2009 | |
| WO | 2011163349 A2 | | 12/2011 | |

OTHER PUBLICATIONS

Garcia-Rejon et al., "Extrusion Blow Molding of Long Fiber Reinforced Polyolefins," Industrial Materials Institute, Polymer Engineering and Science, Feb. 2002, vol. 42, No. 2, pp. 346-364.
International Preliminary Report on Patentability; International Application No. PCT/IB2018/055160; International Filing Date: Jul. 12, 2018; Date of Mailing: Aug. 27, 2019; 15 pages.
International Search Report; International Application No. PCT/IB2018/055160; International Filing Date: Jul. 12, 2018; Date of Mailing: Oct. 5, 2018; 5 pages.
Written Opinion; International Application No. PCT/IB2018/055160; International Filing Date: Jul. 12, 2018; Date of Mailing: Oct. 5, 2018; 5 pages.

* cited by examiner

FIBER REINFORCED ELONGATE PROFILED OBJECT

CROSS-REFERENCE TO RELATED APPLICATIONS

The present application is a 371 of International Application No. PCT/IB2018/055160, filed Jul. 12, 2018, which claims priority to U.S. Provisional Application No. 62/532,600, filed Jul. 14, 2017, both of which are hereby incorporated herein in their entirety.

BACKGROUND OF THE INVENTION

Field of the Invention

The present invention relates to fiber reinforced profiled object, in particular a plank or board, specifically used for scaffolds. Furthermore, the invention relates to a method for making such a fiber reinforced elongate profiled object.

Description of the Related Art

In the building industry, scaffolds, also called scaffolding or staging, are widely used to as a temporary structure to support a work crew and materials to aid in the construction, maintenance and repair of buildings, bridges and other (man-made) structures. In adapted form, scaffolds can be used for formwork and shoring, grandstand seating, concert stages and the like. Several types of scaffolds used worldwide nowadays. The most used and versatile type is the type using Tube and Coupler components, made of steel tubes connected with steel clamps (although aluminum may be used as well). Timber scaffolds are used as well, but have less versatility than steel scaffolding. Often included components are a load-bearing base plate for the scaffolding, an upright component with connector joins, a horizontal ledger, a transom being a horizontal load-bearing component which holds the batten, board or decking unit, a diagonal brace, the batten or board decking component that makes up the working platform, a coupler to join components together, and a scaffold tie to connect the scaffold to the structure it is placed in front of. The batten, board or decking unit is usually made of one or more wooden planks, but LVL planks and metal plates, or combinations thereof, may also be used. These planks are usually quite heavy due to the relatively high density of the material and the large sizes, especially lengthwise, of the planks or plates.

There have been attempts to replace wood, laminated veneer lumber (LVL) and metal with lightweight solutions that would be easier to handle. Such a lightweight solution is sought in the use of fiber reinforced composite materials for the production of scaffolding planks and/or plates. International application WO2009/054716 describes the use of a thermoplastic matrix with glass fibers to extrude elongate objects, such as planks and pipes.

Disadvantageous is that thermoplastic material, even when reinforced with dispersed reinforcing fibers, do not have the required mechanical properties, such as stiffness, to be applied in the building industry. For instance, first generation fiber filled thermoplastic scaffolding planks failed the Occupational Health and Safety Administration (OSHA) mechanical requirement, and were therefore not approved for use in the building industry.

It would therefore be desirable to provide an alternative construction for elongate extruded fiber reinforced objects that alleviated at least some of the perceived inconveniences of the prior art.

BRIEF SUMMARY OF THE INVENTION

According to the invention, there is provided an elongate profiled object having a cross section, the object comprising a peripheral wall, forming a hollow profile extending in a longitudinal direction, wherein at least part of the peripheral wall is provided with a reinforcement element extending in at least the longitudinal direction of the elongate profiled object, and wherein the elongate profiled object is made of a thermoplastic material.

The elongate profiled object is preferably an extruded object. Extruded objects can be distinguished from pultruded elongate objects by their dimensions, as pultruded elongate objects are usually bigger than extruded objects. The reinforcement element is used to improve the mechanical properties of the elongate profiled object, in particular the longitudinal or lengthwise stiffness of the elongate object. Elongate objects made of a thermoplastic material alone are usually sensitive to creep under the influence of either an external load or gravity. By adding the reinforcement element, the creep resistance of the elongate object may be increased. When using unfilled thermoplastic material with the reinforcement element, an amorphous and/or semi-crystalline thermoplastic material is preferred.

Possible thermoplastic materials include polybutylene terephthalate (PBT); acrylonitrile-butadiene-styrene (ABS); polycarbonate; polycarbonate/PET blends; polycarbonate/ABS blends; co-polycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO), or combinations thereof, such as blends or copolymers. The plastic can optionally be reinforced or filled, e.g., with fibers, particles, flakes, as well as combinations comprising at least one of the foregoing. For example, the thermoplastic material can comprise STAMAX™ materials, a long glass fiber reinforced polypropylene commercially available from SABIC, for instance is pellet form with a typical length of about 15 mm and a diameter of about 3 mm. The thermoplastic material can also comprise combinations comprising at least one of any of the above-described materials and/or reinforcements. Alternatively, the thermoplastic material may be an unfilled or unreinforced thermoplastic. Preferably, the thermoplastic material is a fiber filled or fiber reinforced thermoplastic to further increase the stiffness and strength of the elongate object.

The fibers used in the present invention preferably have an aspect ratio of 800 to 1000 prior to processing. The amount of fibers in the thermoplastic material preferably ranges between 10-60 wt. %, preferably 20 to 40 wt. %, in order to obtain the desired mechanical properties.

Examples of the reinforcing material can be fibers, long fibers or continuous fibers, a non-woven or a woven textile of continuous fibers. The thermoplastic material and/or the reinforcement element can comprise at least one of glass, carbon and aramid fiber, respectively. Other possibilities are the less commonly used metal fibers, such as boron-tungsten fibers and silicon carbide coated fibers, or ceramic fibers, such as quartz, silica or alumina fibers. Examples of a thermoset material that can be used for the reinforcement element can be a polyester resin, a polyurethane, epoxy resin, polyimide or a silicone resin, and the like.

The elongate profiled objects may include sections, plates, pipes, planks and the like. The peripheral wall may have a thickness of at least 1 mm, preferably a thickness of 2-5 mm Such elements can be reduced, for example cut, to the desired length. When used as a plank, for instance as a scaffolding plank, a weight reduction with respect to a similarly sized LVL or wooden plank may be achieved.

The cross section of the elongate object can have several forms, such as square, rectangular, circular, or any polygonal shape. For scaffolding planks, the elongate profiled object will have a rectangular shaped cross section, wherein the outer wall comprises two longitudinal profile sidewalls, an upper wall and a bottom wall. The upper and bottom walls have a larger width W than the height H of the sidewalls. For such a shape, the reinforcement element is provided at the upper wall and/or bottom wall, while covering at least part of the upper wall and/or the bottom wall.

The reinforcement element may form a reinforcement layer adjacent to the peripheral wall, preferably to the upper and/or bottom wall for square or rectangular cross sections. Alternatively, the reinforcement element may be formed by at least one fiber monofilament extending in the longitudinal direction of the profiled plank. Preferred is to use a plurality of fiber monofilaments, for instance forming one or more of continuous fiber rods or one or more bundles of monofilaments. The fiber monofilaments, fiber rods or bundles can be evenly distributed along the peripheral wall, in particular over the width of the upper and/or bottom wall. An even distribution of the reinforcement along the peripheral wall provides for a stiffer elongate profiled object. The reinforcement element may comprise fibers, such as glass fiber, metal fiber, polyester fiber, aramid fiber, carbon fiber and the like. When used as a layer on or in the peripheral wall, the reinforcement element may comprise a mesh, for instance made of a metal, a polymer, or from inorganic fibers such as glass fiber. A reinforcement layer may provide reinforcement over a wider range than locally provided reinforcement. Preferably, the reinforcement element comprises a layer of continuous fiber tape or a fiber-reinforced tape provided at at least part of the peripheral wall. The tape may be a monolayer of fibers embedded in a plastic (thermoplastic or thermoset) matrix, such as a unidirectional tape, but may alternatively be a laminate tape comprising multiple layers. The reinforcement element comprising unidirectional tape may take up 15 to 35 vol. % of the elongate object, preferably 15 to 25 vol. %, more preferably about 20 vol. %.

The reinforcement element may be embedded within the profiled object, which can be achieved with an applied outer layer on the reinforcement element. The outer layer may be a relatively thin layer taking up less than 1 vol. % of the elongate object, preferably less than 0.2 vol. %. By embedding the reinforcement element in the upper and/or bottom wall, the reinforcement element may be protected from the elements or other external factors. Embedding may also be advantageous for the bond between the reinforcement element and the thermoplastic material of the elongate object. The outer layer may comprise a similar or dissimilar thermoplastic material as the thermoplastic material of the elongate object. Especially when using a polyolefin material, a different material for the outer layer may be chosen. Unless untreated or unblended, polyolefin materials tend to adhere well to each other when laminated. Additionally, when an outer layer is applied to cover the reinforcement element, several advantageous properties may be provided locally in the outer layer, such as anti-static properties and/or fire resistant properties, for instance by adding an anti-static or a fire resistant or retardant additive to the thermoplastic material of the outer layer. An example of a suitable anti-static additive would be a polyamide/polyether block amide, such as IRGASTAT™ by BASF. An example of a suitable fire retardant additive would be a nitrogen-phosphorus based flame retardant, such as FP2500S™ by Adeka. This may result in a cost saving as now these properties may be incorporated in the plank itself at selective locations, and possibly added in a single production step.

At an exterior, the peripheral wall, for instance on the upper and/or bottom wall, is provided with anti-slip means, such as intermitting protrusions, ribs, or grooves. Other anti-slip provisions may be used as well, such as sand.

According to an embodiment, the profiled object further comprises a plurality of interior cavities, wherein the interior cavities are formed by at least one interior wall extending in the longitudinal direction of the profiled object. The interior wall may extend between two opposite locations at the peripheral wall, for instance for the profiled plank to extend between the upper wall and the bottom wall, or between the opposite sidewalls. The interior wall may connect two opposite locations of the peripheral wall. The number of interior cavities or chambers can be two, divided by one interior wall, or three or more, divided by n−1 interior walls, with n being the number of interior cavities. For a profiled plank, the interior wall may be parallel to either the sidewalls or the upper and bottom walls. Alternatively or additionally, the interior walls may include an angle with the peripheral wall, for instance the upper wall, of between 0 and 90 degrees. The interior cavities may have a rectangular, specifically a square, shape, or a triangular shape, possibly forming a zigzag pattern in the transverse cross section of the profiled object. The interior walls act as reinforcements of the elongate profiled object and enhance the mechanical properties of the object.

The profiled object may have a polygonal cross section with the peripheral wall comprising a plurality of longitudinal walls, and wherein the profiled object comprises a first connecting element at a first longitudinal wall and a second connecting element at a second longitudinal wall, wherein a plurality of profiled objects are interconnected by connecting the first connecting element of a profiled object with the second connecting element of a further profiled object. The connecting elements may both be receiving elements in which a separate connection device can be received. Preferably, the first connecting element is a receiving element and the second connecting element is a protruding element. The connection between the profiled object and the further profiled object may then be established by receiving the protruding element of a profiled plank in the receiving element of a further profiled plank. Depending on the shape of the polygonal profiled object, the connecting elements may be provided on longitudinal sidewalls, such that the plurality of profiled objects are interconnected along their longitudinal sidewalls.

Being able to interconnect multiple profiled objects, specifically when using profiled planks for scaffolding purposes, will increase the mechanical properties in both the longitudinal and the transverse directions, for instance in the bending stiffness, as the number of degrees of freedom for movement of the elongate profiles will decrease.

Preferably, the connecting elements are shaped to form an interlocking connection. The connecting element may be similarly formed as a hook that engages each other. Alternatively, the receiving element may be formed to lock in the protruding element.

The invention also relates to a profiled object system comprising:
- a first elongate profiled object according to any of the preceding claims, having two opposite open-end portions;
- an end cap comprising a cover for closing at least one open end portion of the first elongate profiled object; and/or
- a second elongate profiled object according to any of the preceding claims and an end connection element for connecting the first and second elongate profiled objects at their respective open ends.

In use, it may be desired to connect multiple elongate profiled objects in the longitudinal direction and/or to close the open ends of the elongate profiled object. For the connection, an end connection element may be provided. For the closing of the profiled object, an end cap with a cover may be provided.

Preferably, the end cap and/or the connection element comprise a protruding element commensurate to the open end portion of the elongate profiled object such that upon receipt of the protruding element into the open end a form fitting or clamping connection between the elongate profiled object and the end cap and/or connection element is established.

The connection element may comprise a base portion having two surfaces opposite from each other, wherein from each surface a protruding portion extends, wherein the protruding portion is commensurately shaped to the open end of the profiled object, such that a first protruding portion is received in the open end of the profiled object and a second protruding portion is received in the open end of the further profiled object so as to connect the two profiled objects.

Furthermore, the invention relates to a method for manufacturing a profiled object as described above, the method comprising: molding a thermoplastic material to provide an elongate profiled object having a peripheral wall forming a hollow profile extending in a longitudinal direction; and providing a reinforcement element at at least part of the peripheral wall.

The elongate profiled object may be molded using extrusion molding (extrusion) or any other suitable form of molding, such as injection molding. The reinforcement element may be provided on an already molded elongate object. This can be done in a separate processing step, such as overlaying the peripheral wall with an at least partially covering reinforcement layer, using for example a double belt press, a heat gun or laminating. Alternatively, the reinforcement element may be provided onto the elongate profiled object by means of co-extrusion, either in a single process step, or in a second downstream process step of a multiple step process. The reinforcement layer and/or the outer layer may be co-extruded onto the peripheral wall of the elongate profile object, either simultaneously or in separate downstream steps. Preferably, the thermoplastic material for the elongate profiled object is a fiber filled thermoplastic material.

According to an embodiment, the method further comprises providing an outer layer forming part of the peripheral wall and on the reinforcement element such that the reinforcement layer is embedded within the peripheral wall. The outer layer can be made of any suitable material, such that the peripheral wall is structured as a laminate. Preferably, the outer layer comprises a thermoplastic material similar to the thermoplastic material of the elongate profiled object, preferably with one or more of an anti-static or a fire resistant or retardant additive. The outer layer itself may be a fiber filled thermoplastic.

BRIEF DESCRIPTION OF THE DRAWINGS

The features and advantages of the invention will be further appreciated upon reference to the following drawings of a number of exemplary embodiments, in which:

FIGS. 3a to d show a perspective view of two embodiments of a connection element for the elongate profile plank of FIG. 1a; and FIGS. 4a and b show a perspective view of an end cap for the elongate profile plank of FIG. 1a.

DESCRIPTION OF ILLUSTRATIVE EMBODIMENTS

Figure 1A:
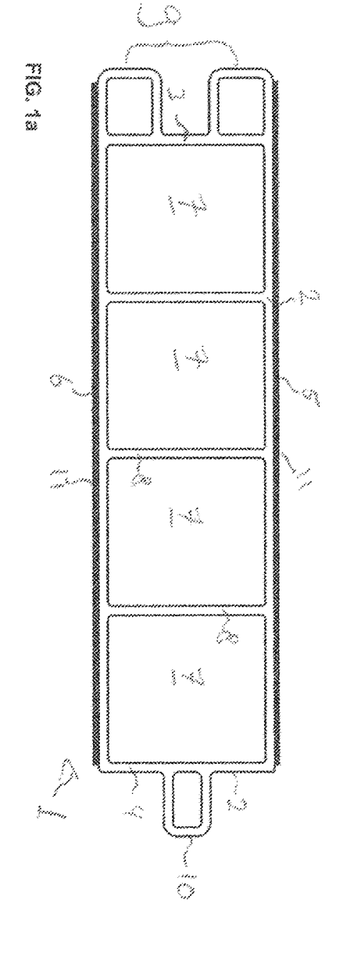
FIGS. 1a-c show schematic cross sections of embodiments for an elongate profile object, in particular an elongate profiled plank, according to the present invention.
Figure 1B:
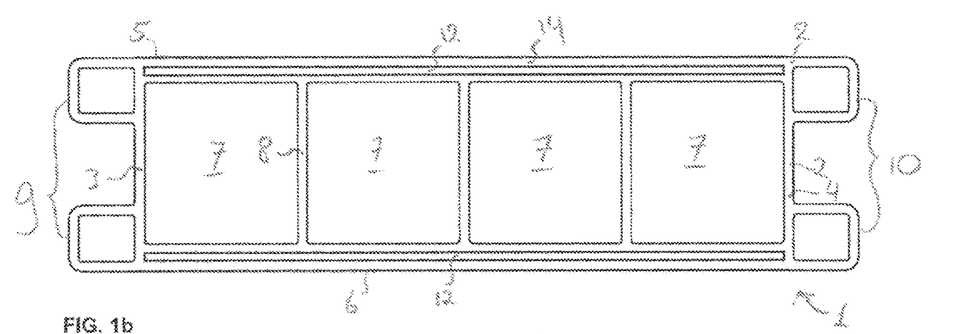
Figure 1C:
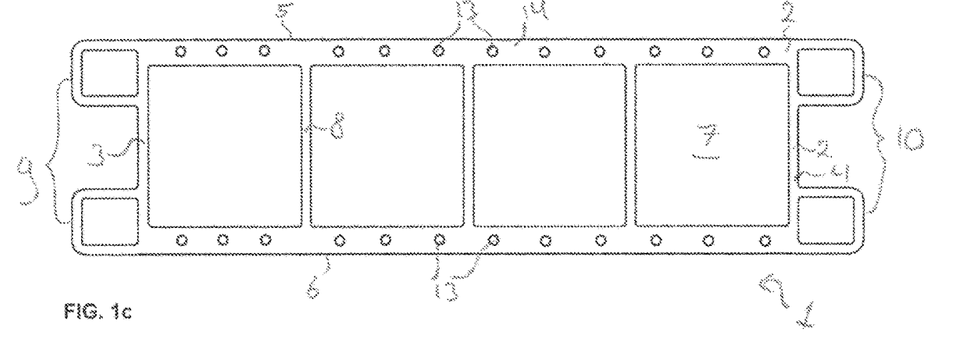

FIGS. 1a to c show schematic cross sections of embodiments for an elongate profile object, in particular an elongate profiled plank 1, according to the present invention. The profiled plank 1 has a rectangular cross section, formed by a hollow profile with a peripheral wall 2 being an outer wall and comprising two longitudinal profile sidewalls 3, 4, an upper wall 5 and a bottom wall 6. The hollow profile has a plurality of interior cavities 7 that are formed by interior walls 8 extending in the longitudinal direction of the elongate plank 1. The plank 1 of FIG. 1 shows four cavities divided by three interior walls 8. These numbers may vary depending on the required properties of the elongate plank. Furthermore, the elongate plank 1 comprises a first connecting element 9 at a first longitudinal wall 3 and a second connecting element 10 at a second longitudinal wall 4. The bottom wall 6 and the upper wall 5 are provided with a reinforcement element 11, 12, 13 to strengthen and stiffen the elongate plank 1. As shown in FIG. 1a, the first connecting element 9 comprises a receiving element and the second connecting element 10 comprises a protruding element that is to be received in the receiving element 9 of a further elongate plank. The receiving element 9 comprises two spaced apart U-shaped profiles that are connected to the first longitudinal wall 3 with their legs. The protruding element 10 also comprises a U-shaped profile that is connected to the second longitudinal wall 4 with its legs. The U-shaped profile of the protruding element 10 fits in the space between the two U-shaped profiles of the receiving element 9, see FIG. 4b. The embodiment of in FIG. 1a further shows that the reinforcement element comprises an outer layer 11, for instance a layer of unidirectional tape, a multidirectional laminate, a mesh, or combinations thereof. This layer 11 is exposed to the exterior of the profiled plank 1.

An elongate profiled plank having the cross section of the embodiment of FIG. 1a and was similarly reinforced by an external reinforcement layer 11 on top and bottom wall, was mechanically tested and compared to other examples. The tests were performed on four different elongate planks: 1) an elongate profiled plank made of a long glass fiber filled polypropylene material, known as STAMAX™, commercialized by SABIC; 2) an elongate LVL plank; 3) an elongate profiled plank made of the same STAMAX™ material as example 1, this time with a layer of unidirectional tape covering the bottom wall (1 side reinforced); and 4) an elongate profiled plank made of the same STAMAX™ material as examples 1 and 3, this time with a layer of unidirectional tape covering the bottom and upper walls (two sides reinforced). The layer(s) of UD tape is about 0.25 mm thick. The four examples were loaded with bending loads of 54, 79, 104 and 129 kilograms. The bending or deflection under every load was compared with the unloaded situation. Table 1 shows the results of the measured deflection with every load, which show that the plank made of long glass fiber filled polypropylene only (with no reinforcements), has the largest deflection under load compared to the LVL and reinforced planks. The one-sided and two-sided reinforced STAMAX™ elongate planks show similar if not better results as the LVL plank. As such, the reinforced elongate planks according to the invention seem comparable to the already used LVL planks in scaffolding structures, at least for the bending stiffness.

TABLE 1

| Load (kg) | 54 | 79 | 104 | 129 | |
|---|---|---|---|---|---|
| Example 1 | 4 | 5.5 | 7 | 9.5 | Deflection (cm) |
| Example 2 | 3.5 | 4.5 | 5.5 | 6.5 | |
| Example 3 | 2.5 | 4 | 5 | — | |
| Example 4 | 3 | 4 | 5.5 | 7 | |

As shown in FIG. 1b, the connecting elements 9, 10 comprise receiving elements that can receive a joining element when connecting to a further profiled plank. The receiving elements 9, 10 each comprise two spaced apart U-shaped profiles that are connected to the longitudinal walls 3, 4 with their legs. The separate joining element may fit in the space between the two U-shaped profiles of the receiving elements. The embodiment of FIG. 1b further shows that the reinforcement element comprises an embedded layer 12, for instance a layer of a continuous fiber tape, a unidirectional tape, a multidirectional laminate, a mesh, or combinations thereof. This layer 12 is covered with an outer layer 14, thus forming a laminate upper and bottom wall 5, 6 for the elongate plank 1.

As shown in FIG. 1c, the reinforcement element comprises a plurality of embedded continuous fiber rods 13. These rods 13 are covered with an outer layer 14, thus forming a laminate upper and bottom wall 5, 6 for the elongate plank 1.

Figure 2A:
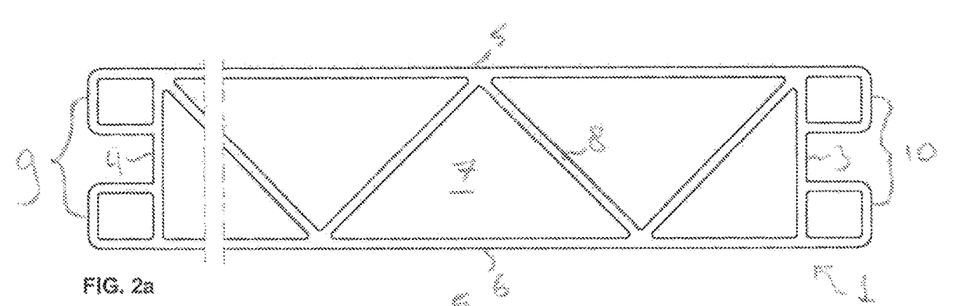
FIGS. 2a-d show a number of schematic possible cross sections for the elongate profiled planks of FIG. 1.

FIGS. 2a-d show a number of schematic possible cross sections for the elongate profiled planks of FIG. 1. FIG. 2a shows a cross section of a profiled plank having a triangular pattern of interior walls 8 that separate the interior cavities 7 from each other. The interior walls 8 extend from the bottom wall 6 to the upper wall 5 in a diagonal fashion.

Figure 2B:
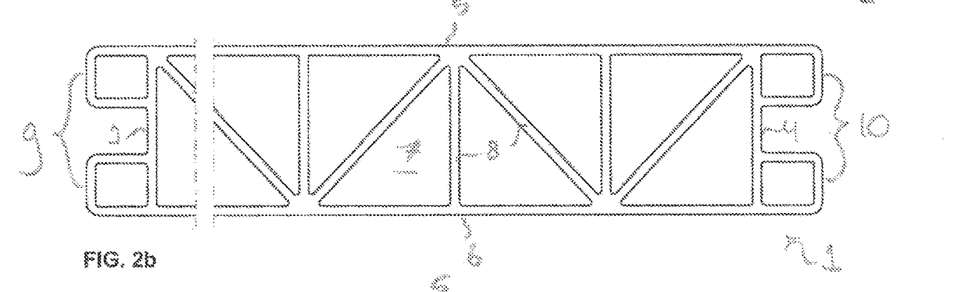

FIG. 2b shows a cross section with smaller triangular shaped interior cavities, formed by interior walls that extend both vertically and diagonally from the upper wall 5 to the bottom wall 6. A vertical interior wall and two diagonal interior walls cross at either the upper or the bottom wall.

Figure 2C:
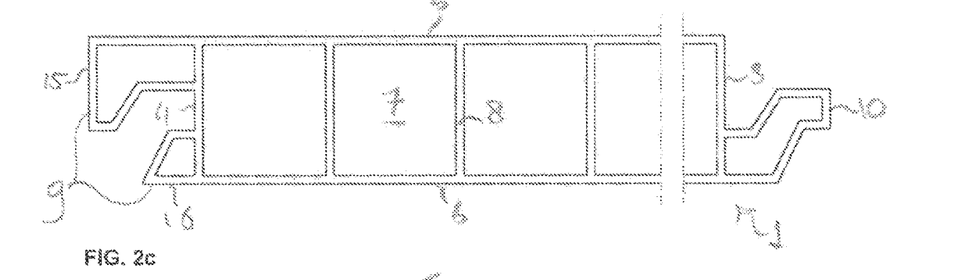

FIG. 2c shows a cross section of a profiled plank of which the receiving element 9 comprises two protruding profiles extending from the first longitudinal sidewall 3, of which a first protruding profile 15 has an angled shape, and a second protruding profile 16 is spaced apart from and shorter than the first protruding profile 15. A space between the two protruding profiles 15, 16 has a hooked shape. The angle of the hooked shaped space is greater than 0 and smaller than 90 degrees, and should have a releasing shape, such that the protruding element 10 at the second longitudinal sidewall 4 can be released. The protruding element 10 has a hooked shape as well, with a first and second angle. The first and second angles are greater than 0 and smaller than 90 degrees. The protruding element 10 is commensurately shaped to the space within the receiving element 9. Upon receipt of the protruding element 10 of the elongate profiled plank 1 in the receiving element 9 of a further elongate profiled plank, an interlocking, but releasable, connection is established between the two elongate profile planks.

Figure 2D:
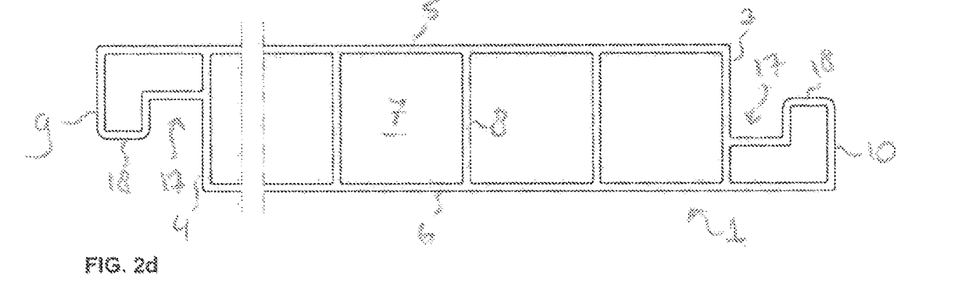

FIG. 2d shows another embodiment of the connection element. The first and second connection elements 9, 10 are similarly hook shaped, but positioned in an opposite direction on their respective longitudinal sidewall 3, 4. A receiving portion 17 is formed between the free end 18 of the hook shaped connection element 9, 10 and the longitudinal sidewall 3, 4. The free end 18 of the connection element 9, 10 forms a protruding portion. Upon connection of the elongate plank 1 with the further elongate plank, the protruding portion 18 of the first connection element 9 of the elongate plank 1 is received in the receiving portion 17 of the second connection element 10 of the further elongate plank.

Figure 3A:
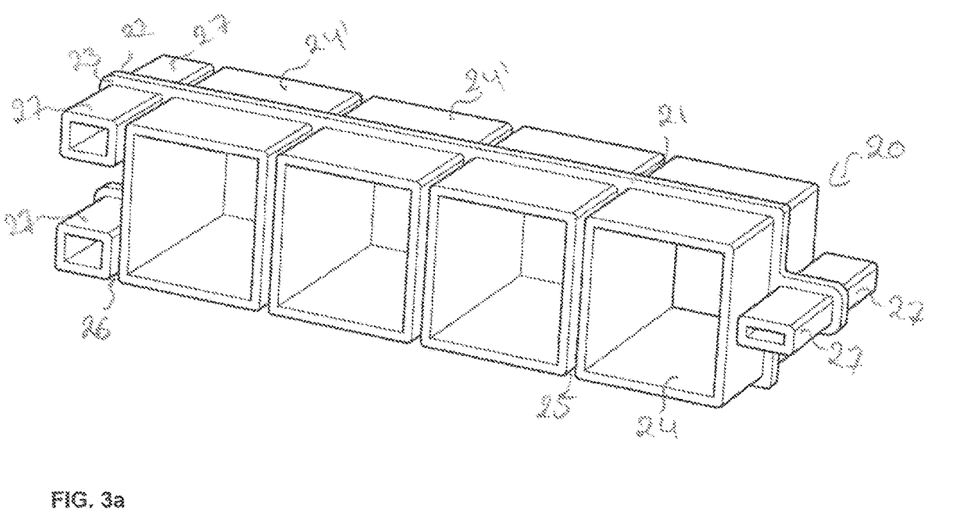
Figure 3B:
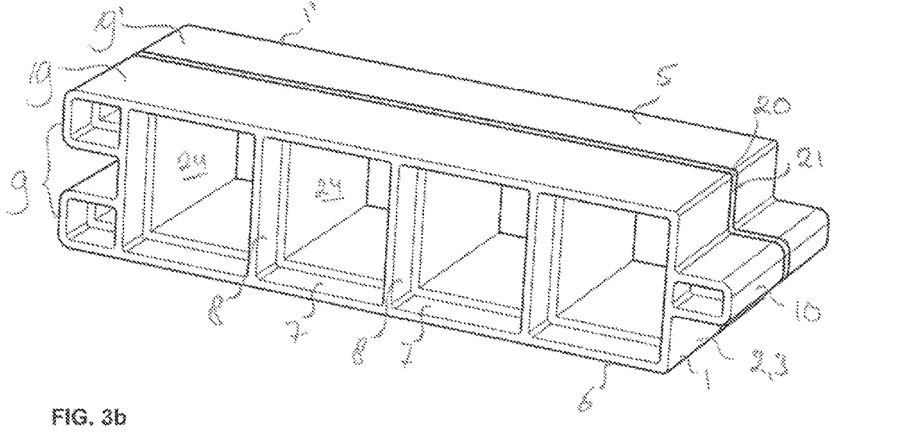

FIGS. 3a to d show a perspective view of two embodiments of a connection element 20 for the elongate profile plank of FIG. 1a. FIG. 3a shows a connection element comprising a base portion 21 having two opposite surfaces 22, 23. From each surface 22, 23 a plurality of spaced apart protruding portions 24 extends, with a space 25 between them. Each protruding portion 24 is commensurately shaped to the interior cavity 7 that opens out at an open end 9 of the profiled plank 1, as shown in FIG. 3b. Upon connection of the profiled plank 1 with the further profiled plank at their respective open ends 19, a first protruding portion 24' is received in the open end 19 of the profiled plank 1 and a second protruding portion 24" is received in the open end 19 of the further profiled plank 1'. The protruding portion 24 and the interior cavity 7 are commensurately shaped and with that establish a form fit connection between the connection element and the profiled plank 1. The form fit connection is further enhanced by the receipt of the interior walls 8 of the profiled plank 1 in the spaces 25 between the protruding portions 24. The connection element further has protruding portions 26 that are commensurate to the receiving element 9 and protruding element 10 of the connecting element at the respective longitudinal sidewalls of the profiled plank 1.

Figure 3C:
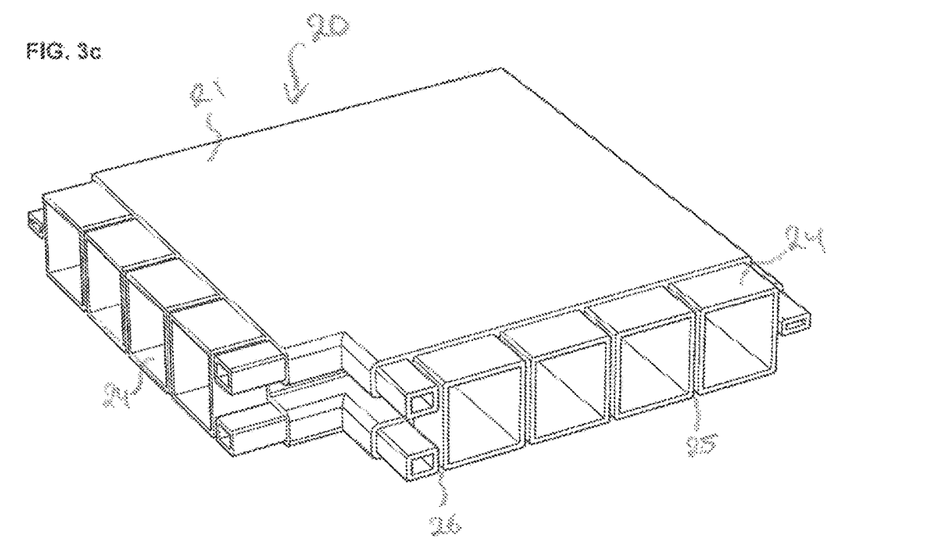
Figure 3D:
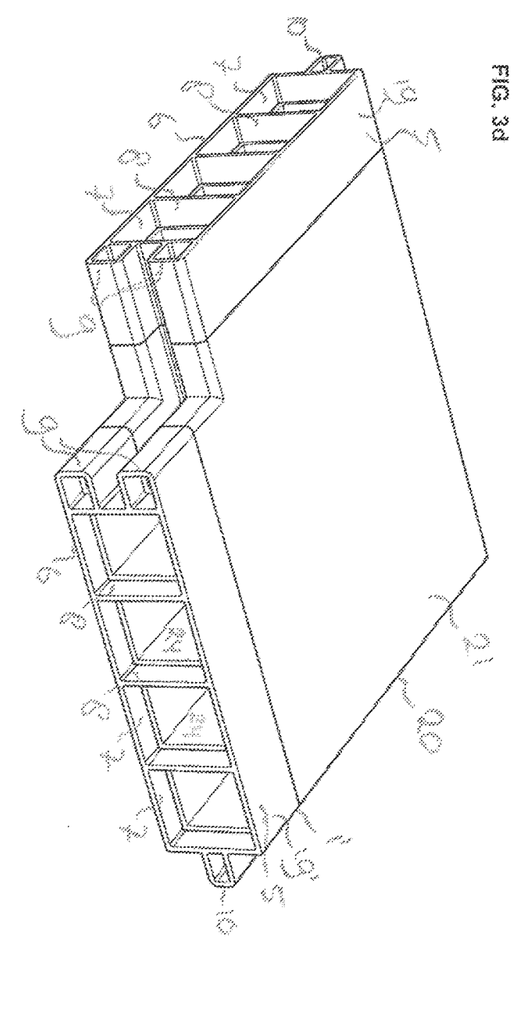

The base portion 21 of the connection element 20 may be a strip of material that is flush with an upper surface of the profiled plank 1, as shown in FIGS. 3a and 3b. However, the base portion 21 may have any shape as desired, for instance shaped with a bend directed in a same plane as the longitudinal direction of the profiled plank, or a bend directed perpendicular to the plane of the longitudinal direction of the profiled plank, i.e. to create an off-set in height. The bend may have any angle between 0 to 180 degrees. FIGS. 3c and d show an embodiment of the connection element having a perpendicular bend, such that the longitudinal directions of the profiled planks connected by the connection element will enclose an angle different from 0 degrees.

Figures 4A, 4B:
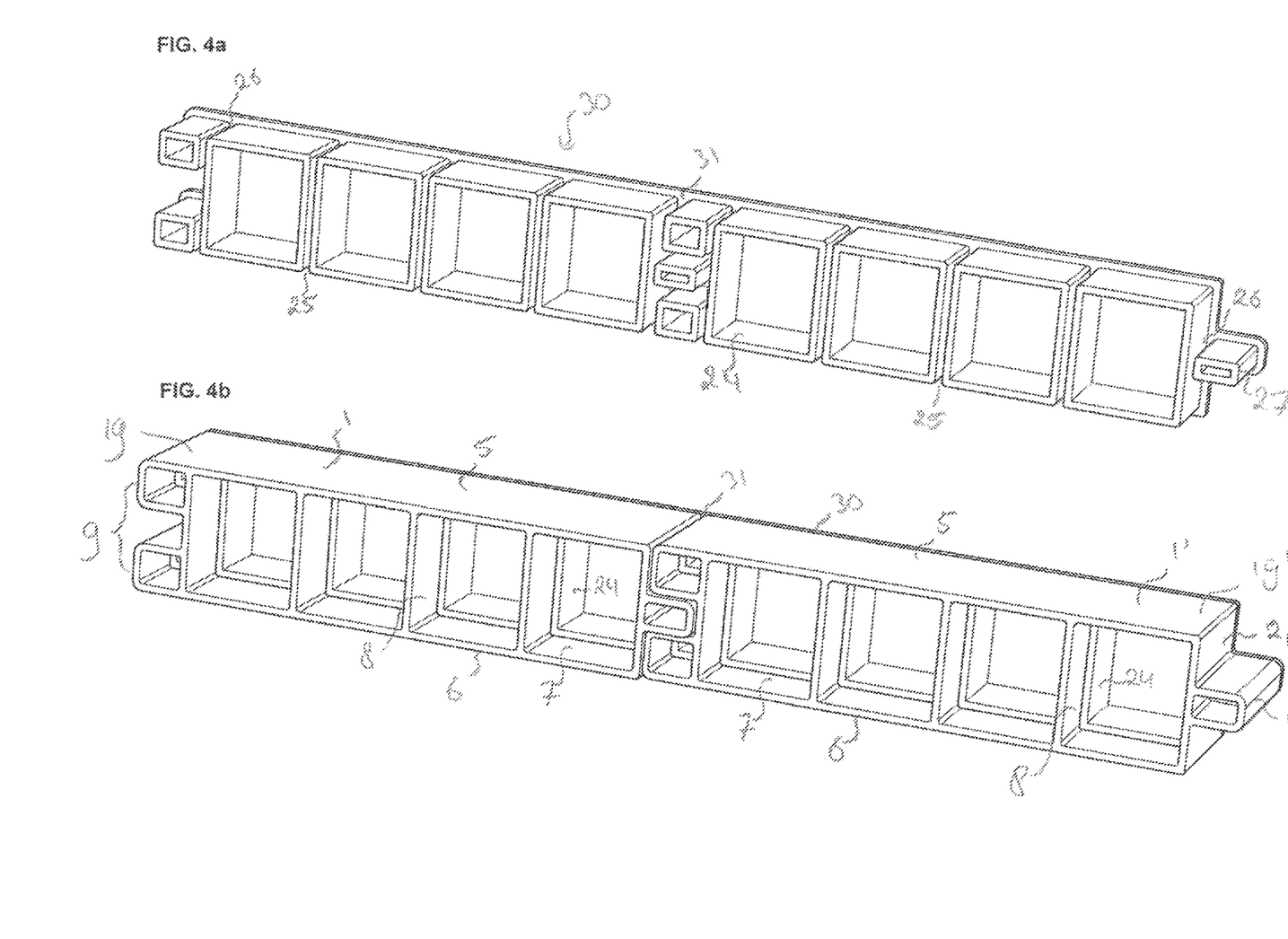

FIG. 4a shows two end caps 30 for closing the open ends 19 of two connected profiled planks 1, see FIG. 4b. The end cap 30 has a closed base 31 from which spaced apart protruding portions 24, 27 extend. The interior walls 8 of the profiled planks are received by spaces between first protruding portions 24 that are shaped commensurate to the interior cavities 7. Edges of the longitudinal sidewalls of the profiled planks are received by spaces between the first protruding portions 24 and second protrusions 26 that are shaped commensurate to the profiles of the receiving element 9 and protruding element 10 of the profiled planks 1.

The profiled plank with the connection element and/or the end cap forms a profiled plank system 100 that can be used to construct several scaffolding structures, for example.

The present methods and systems are disclosed and described above, however it is to be understood that the methods and systems are not limited to specific synthetic methods, specific components, or to particular compositions. It is also to be understood that the terminology used herein is for describing particular examples only and is not intended to be limiting. While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

Set forth below are some aspects of the objects, systems, and methods disclosed herein.

Aspect 1: Elongate profiled object having a cross section, the object comprising a peripheral wall, forming a hollow profile extending in a longitudinal direction, wherein at least part of the peripheral wall is provided with a reinforcement element, and wherein the elongate profiled object is made of a thermoplastic material.

Aspect 2: The object according to aspect 1, wherein the reinforcement element forms a reinforcement layer adjacent to the peripheral wall.

Aspect 3: The object according to aspect 1 or 2, wherein the reinforcement element is embedded within the thermoplastic material of the profiled object.

Aspect 4: The object according to any of the preceding aspects, wherein the reinforcement element comprises a layer of continuous fiber tape or a fiber-reinforced tape provided at at least part of the peripheral wall.

Aspect 5: The object according to any of aspects 1-3, wherein the reinforcement element is formed by at least one fiber monofilament extending in the longitudinal direction of the profiled object.

Aspect 6: The object according to any of the preceding aspects, wherein the thermoplastic material comprises a polyolefin material, such as polypropylene.

Aspect 7: The object according to any of the preceding aspects, wherein the thermoplastic material is a fiber filled or reinforced thermoplastic comprising at least one of long glass fibers, short glass fibers, and carbon fiber.

Aspect 8: The object according to any of the preceding aspects, wherein the reinforcement element comprises at least one of inorganic fibers, such as glass fiber, carbon fiber, metal fiber, and the like, and an inorganic mesh, preferably a lightweight metal mesh.

Aspect 9: The object according to any of the preceding aspects, further comprising a plurality of interior cavities, wherein the interior cavities are formed by at least one interior wall extending in the longitudinal direction of the profiled object.

Aspect 10: The object according to any of the preceding aspects, having a polygonal cross section with the peripheral wall comprising a plurality of longitudinal walls, and wherein the profiled object comprises a first connecting element at a first longitudinal wall and a second connecting element at a second longitudinal wall, wherein a plurality of profiled objects are interconnected by connecting the first connecting element of a profiled object with the second connecting element of a further profiled object.

Aspect 11: The object according to any of the preceding aspects, wherein the peripheral wall has a rectangular shaped cross section, the peripheral wall comprising two longitudinal profile sidewalls, an upper wall and a bottom wall, wherein the reinforcement element is provided in at least one of the profile sidewall, upper wall and bottom wall, and wherein the elongate profiled object is made of a fiber filled thermoplastic material.

Aspect 12: A system comprising: a first extruded elongate profiled object according to any of the preceding aspects, having two opposite open-end portions; an end cap comprising a cover for closing at least one open end portion of the first elongate profiled object; and/or a second extruded elongate profiled object according to any of the preceding aspects and an end connection element for connecting the first and second elongate profiled objects at their respective open ends.

Aspect 13: The system according to aspect 12, wherein the end cap and/or the connection element comprise a protruding element commensurate to the open end portion of the elongate profiled object such that upon receipt of the protruding element into the open end a form fitting or clamping connection between the elongate profiled object and the end cap and/or connection element is established.

Aspect 14: The system according to aspect 12 or 13, wherein the connection element comprises a base portion having two surfaces opposite from each other, wherein from each surface a protruding portion extends, wherein the protruding portion is commensurately shaped to the open end of the profiled object, such that a first protruding portion is received in the open end of the profiled object and a second protruding portion is received in the open end of the further profiled object so as to connect the two profiled objects.

Aspect 15: A method for manufacturing a profiled object according to any of aspects 1 to 11, the method comprising: extruding a thermoplastic material to provide an extruded elongate profiled object having a peripheral wall forming a hollow profile extending in a longitudinal direction; and providing a reinforcement element at at least part of the peripheral wall.

Aspect 16: The method according to aspect 15, further comprising providing an outer layer forming part of the peripheral wall, and on the reinforcement element such that the reinforcement element is embedded within the peripheral wall.

Aspect 17: The method according to aspect 16, wherein the outer layer comprises a thermoplastic material similar to the thermoplastic material of the elongate profiled object, preferably with one or more of an anti-static or fire resistant additive.

Aspect 18: The method according to aspect 16 and 17, wherein the reinforcement element and/or the outer layer are co-extruded onto the peripheral wall of the elongate profile object.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., 5 wt % to 20 wt %," is inclusive of the endpoints and all intermediate values of the ranges of "5 wt % to 25 wt %,"). The terms "a" and "an" and "the" herein do not denote a limitation of quantity, and are to be construed to cover both the singular and the plural, unless otherwise indicated herein or clearly contradicted by context. "Or" means "and/or" unless specifically specified otherwise.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including matters of logic with respect to arrangement of steps or operational flow; plain meaning derived from grammatical organization or punctuation; and the number or type of examples described in the specification.

It is also to be understood that the terminology used herein is for describing particular examples only and is not intended to be limiting. Unless defined otherwise, all technical and scientific terms used herein have the same meaning as commonly understood by one of ordinary skill in the art to which this disclosure belongs. In this specification and in the claims that follow, reference will be made to a number of terms that shall be defined herein.

LIST OF PARTS

1. Elongate profiled plank
2. Peripheral wall
3. First longitudinal sidewall
4. Second longitudinal sidewall
5. Upper wall
6. Bottom wall
7. Interior cavity
8. Interior wall
9. First connecting element/receiving element
10. Second connecting element/protruding element
11, 12, 13. Reinforcement element
14. Outer layer
15. First protruding profile
16. Second protruding profile
17. Receiving portion
18. Free end/protruding portion
19. Open end
20. Connection element
21. Base portion
22, 23. Opposite surfaces
24, 27. Protruding portion
25, 26. Space
30. End cap
31. Base part
100. Profiled plank system

We claim:

1. Elongate profiled scaffold planks, each comprising:
an outer peripheral wall, forming a hollow profile extending in a longitudinal direction between opposite open-end portions,
wherein the outer peripheral wall defines a rectangular shaped cross section, and
the outer peripheral wall comprises:
first and second longitudinal profile sidewalls that are widthwise spaced apart from each other; and
an upper wall and a bottom wall that are height-wise spaced apart from each other,
wherein the hollow profile is defined by one or more longitudinal interior cavities extending within the outer profile wall, between the opposite open-end portions, and
wherein the elongate profiled scaffold planks are formed of a thermoplastic material that is fiber filled,
wherein a reinforcement element is provided in the upper wall and the bottom wall,
wherein the reinforcement element comprises an embedded layer of continuous fiber tape or unidirectional tape extending in the longitudinal direction between the opposite open-end portions,
wherein the reinforcement element includes at least one fiber monofilament extending in the longitudinal direction, and
wherein the embedded layer is covered by an outer layer of the thermoplastic material, so that the upper and bottom walls form a laminate; and
wherein:
a first one of the elongate profiled scaffold planks further comprises:
a first connecting elements formed longitudinally along one of the first and second longitudinal profile sidewalls, to connect with a second one of the other elongate profiled scaffold planks;
wherein the first connecting elements comprises a pair of U-profiles that are height-wise spaced apart from each other, each one of the pair of U-profiles being connected by its legs to the one of the first and second sidewalls so that one of the pair of U-profiles is located at the upper wall and another one of the pair of U-profiles is located at the bottom wall; and
a second one of the elongate profiled scaffold planks further comprises:
a second connecting element formed longitudinally along one of the first and second longitudinal profile sidewalls, to connect with the first one of the elongate profiled scaffold planks;
wherein the second connecting element comprises one U-profile connected by its legs to the one of the first and second sidewalls so that the one U-profile is located at a height-wise center to the one of the first and second sidewalls and fits between the pair of U-profiles of the first one of the elongate profiled scaffold planks to interconnect the first and second ones of the elongate profiled scaffold planks.

2. The elongate profiled scaffold planks according to claim 1, wherein the thermoplastic material comprises a polyolefin material.

3. The elongate profiled scaffold planks according to claim 1, wherein the thermoplastic material comprises at least one of long glass fibers, short glass fibers, and carbon fiber.

4. The elongate profiled scaffold planks according to claim 1, wherein the reinforcement element comprises at least one of inorganic fibers, and an inorganic mesh.

5. The elongate profiled scaffold planks according to claim 1, further comprising a plurality of the longitudinal interior cavities, wherein the longitudinal interior cavities are formed by at least one interior wall, disposed widthwise between the first and second longitudinal profile sidewalls, extending in the longitudinal direction of the elongate profiled scaffold plank and height-wise between the upper and bottom walls.

6. The elongate profiled scaffold planks according to claim 1, wherein the reinforcement element comprises at least one of glass fiber, carbon fiber, and metal fiber, and a lightweight metal mesh, and wherein the thermoplastic material comprises a polypropylene.

7. The elongate profiled scaffold planks of claim 1, wherein:
the first longitudinal profile sidewall of the first one of the elongate profiled scaffold planks comprises the first connecting element, and the second longitudinal profile sidewall of the first one of the elongate profiled scaffold planks comprises a third connecting element that is the same as the first connecting element; and
the first longitudinal profile sidewall of the second one of the elongate profiled scaffold planks comprises the second connecting element, and the second longitudinal profile sidewall of the second one of the elongate profiled scaffold planks comprises a fourth connecting element that is the same as the first connecting element.

8. The elongate profiled scaffold planks of claim 1, wherein the fibers that fill the thermoplastic material consist of one or more of short and long glass fibers.

9. Elongate profiled scaffold planks, each comprising:
an outer peripheral wall, forming a hollow profile extending in a longitudinal direction between opposite open-end portions,
wherein the outer peripheral wall defines a rectangular shaped cross section, and
the outer peripheral wall comprises:
first and second longitudinal profile sidewalls that are widthwise spaced apart from each other; and
an upper wall and a bottom wall that are height-wise spaced apart from each other,
wherein the hollow profile is defined by one or more longitudinal interior cavities extending within the outer profile wall, between the opposite open-end portions, and
wherein the elongate profiled scaffold planks is are formed of a thermoplastic material that is fiber filled,
wherein a reinforcement element is provided in the upper wall and the bottom wall,
wherein the reinforcement element includes embedded continuous fiber rods extending in the longitudinal direction between the opposite open-end portions and which are widthwise spaced apart from each other, and
wherein the embedded continuous fiber rods are covered by an outer layer of the thermoplastic material, so that the upper and bottom walls form a laminate;

wherein:
a first one of the elongate profiled scaffold planks further comprises:
a first connecting element formed longitudinally along one of the first and second longitudinal profile sidewalls, to connect with a second one of the elongate profiled scaffold planks;
wherein the first connecting element comprises a pair of U-profiles that are height-wise spaced apart from each other, each one of the pair of U-profiles being connected by its legs to the one of the first and second sidewalls so that one of the pair of U-profiles is located at the upper wall and another one of the pair of U-profiles is located at the bottom wall; and
a second one of the elongate profiled scaffold planks further comprises:
a second connecting element formed longitudinally along one of the first and second longitudinal profile sidewalls, to connect with the first one of the elongate profiled scaffold planks;
wherein the second connecting element comprises one U-profile connected by its legs to the one of the first and second sidewalls so that the one U-profile is located at a height-wise center to the one of the first and second sidewalls and fits between the pair of U-profiles of the first one of the elongate profiled scaffold planks to interconnect the first and second ones of the elongate profiled scaffold planks.

10. The plank of claim 9, wherein:
the first longitudinal profile sidewall of the first one of the elongate profiled scaffold planks comprises the first connecting element, and the second longitudinal profile sidewall of the first one of the elongate profiled scaffold planks comprises a third connecting element that is the same as the first connecting element; and
the first longitudinal profile sidewall of the second one of the elongate profiled scaffold planks comprises the second connecting element, and the second longitudinal profile sidewall of the second one of the elongate profiled scaffold planks comprises a fourth connecting element that is the same as the first connecting element.

11. The elongate profiled scaffold planks of claim 9, wherein the fibers that fill the thermoplastic material consist of one or more of short and long glass fibers.

* * * * *